US012128457B2

(12) United States Patent
Smith

(10) Patent No.: US 12,128,457 B2
(45) Date of Patent: Oct. 29, 2024

(54) AIR SEPARATION MODULE (ASM) CONTAMINATION APPARATUS AND REMOVAL PROCESS

(71) Applicant: AeroParts Manufacturing & Repair, Inc., Rio Rancho, NM (US)

(72) Inventor: Jeffrey S. Smith, Coral Springs, FL (US)

(73) Assignee: AeroParts Manufacturing & Repair, Inc., Rio Rancho, NM (US)

(*) Notice: Subject to any disclaimer, the term of this patent is extended or adjusted under 35 U.S.C. 154(b) by 0 days.

(21) Appl. No.: 18/301,788

(22) Filed: Apr. 17, 2023

(65) Prior Publication Data

US 2024/0109106 A1     Apr. 4, 2024

Related U.S. Application Data

(60) Provisional application No. 63/331,843, filed on Apr. 17, 2022.

(51) Int. Cl.
| | |
|---|---|
| *B08B 5/02* | (2006.01) |
| *B01D 53/22* | (2006.01) |
| *B01D 65/02* | (2006.01) |
| *B01D 69/08* | (2006.01) |
| *B01D 71/64* | (2006.01) |
| *B08B 13/00* | (2006.01) |

(52) U.S. Cl.
CPC .............. *B08B 5/02* (2013.01); *B01D 53/228* (2013.01); *B01D 65/02* (2013.01); *B01D 69/08* (2013.01); *B01D 71/64* (2013.01); *B08B 13/00* (2013.01); *B01D 2321/16* (2013.01); *B01D 2321/185* (2013.01); *B01D 2321/44* (2022.08)

(58) Field of Classification Search
CPC ......... B08B 5/02; B08B 13/00; B01D 53/228; B01D 65/02; B01D 69/08; B01D 71/64; B01D 2321/44; B01D 2321/16; B01D 2321/185
See application file for complete search history.

(56) References Cited

U.S. PATENT DOCUMENTS

| | | | |
|---|---|---|---|
| 6,736,871 B1 | 5/2004 | Green et al. | |
| 2003/0015185 A1* | 1/2003 | Dutart | F02B 37/00 123/585 |

(Continued)

FOREIGN PATENT DOCUMENTS

| | | | | |
|---|---|---|---|---|
| CN | 113082891 A | 7/2021 | | |
| EP | 2644507 A2 * | 10/2013 | ............... | B01D 5/00 |
| KR | 100861778 B1 | 10/2008 | | |

OTHER PUBLICATIONS

Written Opinion of the International Searching Authority, International Searching Authority, Aug. 30, 2023.

(Continued)

*Primary Examiner* — Sharidan Carrillo
(74) *Attorney, Agent, or Firm* — Kameron W. Kramer

(57) ABSTRACT

An apparatus and method for cleaning and restoring air separation modules (ASMs). The present invention cleans and restores ASMs that comprise a gas permeable fiber module that uses a fiber composition in the polyimide hollow fiber family. The present invention removes contaminants, such as fuel, from an ASM by blowing air at environmental temperature into the ASM, and then restores the ASM by blowing hot air into the ASM.

11 Claims, 2 Drawing Sheets

(56) References Cited

U.S. PATENT DOCUMENTS

| | | | | |
|---|---|---|---|---|
| 2014/0053726 A1* | 2/2014 | Evosevich | ............ | B64D 37/32 |
| | | | | 977/773 |
| 2015/0027305 A1* | 1/2015 | Evosevich | ............ | B01D 63/02 |
| | | | | 95/47 |
| 2016/0325217 A1 | 11/2016 | Park et al. | | |
| 2017/0157547 A1 | 6/2017 | Payne | | |

OTHER PUBLICATIONS

International Search Report, Patent Cooperation Treaty, Aug. 30, 2023.
Search Hisotry, Patent Cooperation Treaty, Jul. 22, 2023.

\* cited by examiner

AIR SEPARATION MODULE (ASM) CONTAMINATION APPARATUS AND REMOVAL PROCESS

CROSS-REFERENCE TO RELATED APPLICATION

This application claims the benefit of U.S. Provisional Patent Application Ser. No. 63/331,843 filed Apr. 17, 2022, titled "Air Separation Module (ASM) Contamination Apparatus and Removal Process" and the subject matter thereof is incorporated herein by reference thereto.

TECHNICAL FIELD

The present invention relates to air separation modules (ASM), and more specifically, to cleaning and restoring ASMs.

PRIOR ART

Fuel tanks are susceptible to combustion of flammable materials store in a confined space. When a combustible liquid, commonly gasoline, diesel fuel, aviation fuel, jet fuel, or rocket propellant, is stored in a confined space, there is a space above the fuel, called the ullage. The ullage contains evaporated fuel mixed with air, which contains the oxygen necessary for combustion. This mixture can ignite provided an ignition source exists. An inerting system decreases the probability of combustion by replacing the air with an inert gas such as nitrogen or air of sufficiently reduced oxygen content resulting in nitrogen enriched air which cannot support combustion. Inerting refers to this introduction of an inert gas, such as nitrogen or nitrogen enriched air, into a closed system to make the system non-ignitable.

Fuel tank explosions can cause catastrophic damages and death. The Federal Aviation Administration (FAA) has been tracking fuel tank explosions, specifically those in aircrafts, since 1959. Between 1959 and 2012, 18 fuel tank explosions on transport category aircraft occurred. The most notable event occurring in 1996 in the explosion of a B747-100 series aircraft operating as TWA Flight 800. It was determined that the explosion was the result of ignition of fuel vapor and air in the center wing fuel tank. Although the ignition source was never conclusively identified, the center wing fuel tank (NTSB) concluded there was a flaw in the design and certification philosophy of the FAA with respect to fuel tank flammability. The previous philosophy had been to remove any ignition source from the "fire triangle" (fuel, oxidizer, ignition source). The FAA's new philosophy concentrated on reducing the oxidizer and effectively controlling the dispersion and confinement legs of the "explosion pentagon" (fuel, oxidizer, ignition source, confinement, dispersion) to prevent further explosions.

Subsequently, the FAA established the Aviation Rulemaking Advisory Committee (ARAC) task force groups to reduce the flammability of fuel tanks as part of a Fuel Tank Harmonization Working Group. One task group was specifically assigned to study the means of reducing on-board fuel tank flammability though On-Board Inert Gas Generation System (OBIGGS). OBIGGS separate nitrogen from engine bleed air. Such systems existed on military aircraft, notably the C-17 as well as some fighters and helicopters. None of the airplanes analyzed had enough engine bleed air available to supply these systems. Several on-board systems were reviewed. Exhaust gas from the jet's engines and auxiliary power unit (APU) were deemed infeasible primarily because the exhaust contains too much oxygen. Carbon dioxide in gaseous and solid (dry ice) form was also deemed infeasible. Except for nitrogen systems, none of the systems were mature enough to be considered for installation on commercial aircraft.

It was determined that nitrogen systems were the best candidate of this inerting method, and the FAA passed certain regulations relating to the installation of inerting systems on commercial aircraft. As such, aircraft manufacturers contracted their system integrators to create a system to provide nitrogen enriched air to the fuel tanks as a preventative measure for fuel explosion incidents.

This system includes any number of components that can experience irreparable damage once exposed to fuel. The check valves in this system are flapper seal type check valves. The sloshing of fuel can allow fuel to be released through the check valves.

An air separation module (ASM) uses fiber membranes to remove oxygen from the supplied pressurized air stream and generates nitrogen-enriched air that is distributed to the fuel tanks.

The ASM experiences contamination over the desired useful life. Various contaminants are present in the supply air such as engine oil, jet fuel, anti-ice fluid, ozone, moisture, etc. The fuel tank can also leach or flow back into the system thereby filling or contaminating the ASM rendering it inoperable. Exposure to contaminants over time will result in the degradation of the fibers of the ASM. Depending on the type of polymer used for the fiber and the type of contaminant, the degradation of the ASM will occur at various rates.

The delicate hollow fibers of an ASM become damaged during use, thus lowering the performance of the ASM. This typically requires replacement of the ASM.

In the event that an ASM is contaminated by fuel or other contaminants, the present invention cleans and restores the ASM. This works specifically with ASMs that contain thermal cross-linked fibers.

The present invention overcomes the shortcomings contained in the prior art by providing a method to clean and restore ASMs that is inexpensive, easy to use, and effective.

SUMMARY OF THE INVENTION

The present invention provides an apparatus and method for cleaning and restoring ASMs. Specifically, the present invention cleans and restores ASMs that comprise a gas permeable fiber module that uses a fiber composition in the polyimide hollow fiber family. This material provides the most robust fiber for aircraft application. In addition, the fiber is manufactured using a cross-linking process that provides additional fiber endurance as related to chemical exposure as well as high temperature.

Exposure to contaminants over time degrades the fibers of the ASM. None of the prior art fully addresses the problems resolved by the present invention. The present invention overcomes these limitations contained in the prior art by providing an apparatus and method to clean and restore ASMs that is sturdy, cheap, effective, and easy to use.

Certain embodiments of the invention have other steps or elements in addition to or in place of those mentioned above. The steps or element will become apparent to those skilled in the art from a reading of the following detailed description when taken with reference to the accompanying figures, if any.

DETAILED DESCRIPTION OF THE INVENTION

Figure 1:
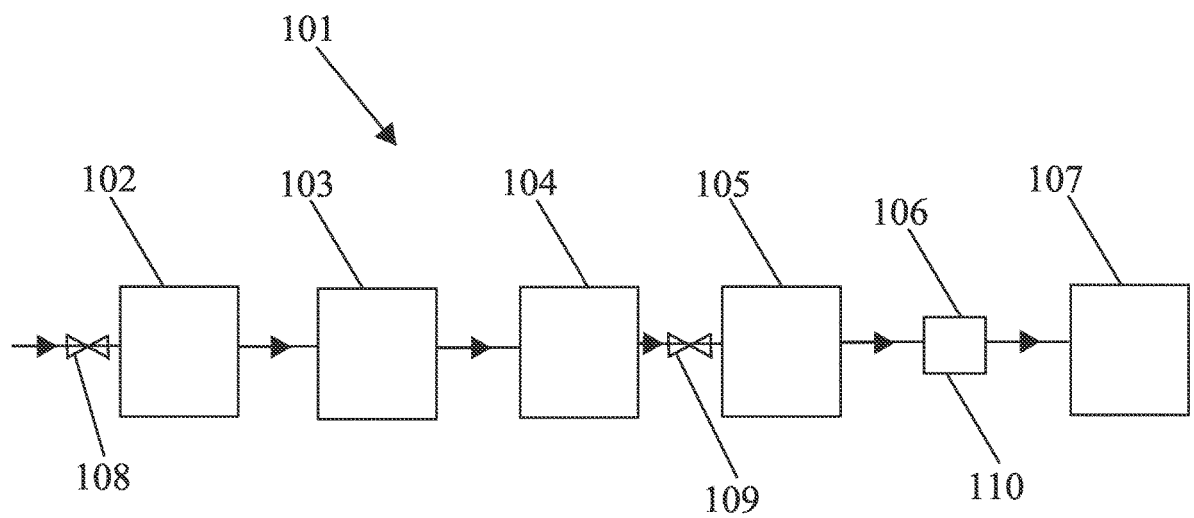
FIG. 1 illustrates a block diagram of an inerting fuel tank system.

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail. The figures illustrating embodiments of the system, if any, are semi-diagrammatic and not to scale and, particularly, some of the dimensions are for the clarity of presentation and are shown exaggerated in the drawing figures.

Alternate embodiments have been included throughout, and the order of such are not intended to have any other significance or provide limitations for the present invention.

For expository purposes, the term "horizontal" as used herein is defined as a plane parallel to the plane or surface of the present apparatus, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures, if any. The term "on" means that there is direct contact among elements.

The term "fluid" as used herein includes any substance that flows, including air. In the preferred embodiment, engine bleed air is the fluid that flows through the apparatus of the present invention.

The terms "oxygen" and "$O_2$" may be used interchangeably.

The present invention provides an apparatus and method for the cleaning of ASMs, specifically ASMs that comprise crosslinked membranes or membranes that can tolerate a high heat.

The present invention provides a method to remove liquid fuel and other contaminants and restore an ASM, comprising connecting an ASM cleaning and restoration apparatus to an ASM, wherein the ASM cleaning and restoration apparatus comprises a conditioned air supply (dry and oil free), a pressure control valve, a flow meter, an air heater, a hydrocarbon sensor, at least one pressure sensor, at least one temperature sensor, a fuel collection tank, computer control and software, a supporting frame, power supply, and supply hoses and tubes, wherein the ASM comprises a nitrogen-enriched air port, an oxygen enriched air port, and an inlet feed air port, wherein the ASM cleaning and restoration apparatus is connected to the ASM via the inlet feed air port; removing liquid fuel and other contaminants of the ASM, wherein the ASM cleaning and restoration apparatus blows air through the ASM in order to remove the liquid fuel and other contaminants, wherein the liquid fuel and other contaminants are collected in a fuel collection tank, wherein the air flows freely out of the ASM via the nitrogen-enriched air port and the oxygen enriched air port; and restoring an ASM, wherein the ASM cleaning and restoration apparatus blows air through the ASM, and wherein the hydrocarbon sensor monitors the level of hydrocarbons in the air that flows through the ASM and exits the ASM via the nitrogen-enriched air port.

In the preferred embodiment of the present invent, the method to remove liquid fuel and other contaminants and restore an ASM comprises the ASM cleaning and restoration apparatus blows air through the ASM at a flow rate of about 4 lb/min at environmental air temperature for about 8 hours to remove the liquid fuel and other contaminants of the ASM, and wherein the ASM cleaning and restoration apparatus blows air through the ASM at a flow rate of about 4 lb/min at a minimum of 250° F. air temperature for about 36 hours to restore the ASM.

The ASM cleaning and restoration apparatus of the present invention comprises the following: conditioned air supply (dry and oil free), pressure control valve, flow meter, air heater, hydrocarbon sensor, pressure sensors, temperature sensors, fuel collection tank, computer control and software, supporting frame, power supply, and supply hoses and tubes. This list of components of the ASM cleaning and restoration apparatus are the primary components, but there may be other components present.

The ASM cleaning and restoration apparatus begins restoring the ASM when the liquid fuel and other contaminants have been removed from the ASM, as determined by a level sensor in the fuel collection tank. The removal of the contaminants of the ASM is complete when the level sensor in the fuel collection tank stops rising.

The ASM cleaning and restoration apparatus monitors the air that flows through the ASM and out the nitrogen enriched air port during the restoration and shuts down the ASM cleaning and restoration apparatus when substantially all the hydrocarbons have been removed from the air exiting the ASM via the nitrogen-enriched air port.

The computer control and software control the temperature, the flow rate, and the length of time for the air flow to the ASM from the ASM cleaning and restoration apparatus.

In another embodiment of the present invention, a method to remove liquid fuel and other contaminants and restore an ASM is provided, comprising removing the liquid fuel and other contaminants of the ASM, wherein air is blown through the ASM, wherein liquid fuel and other contaminants from the ASM are collected in a fuel collection tank; and restoring an ASM, wherein air is blown through the ASM, and wherein a hydrocarbon sensor monitors the level of hydrocarbons in the air that flows through the ASM.

FIG. 1 shows a block diagram of an inerting fuel tank system 101, typically referred to as an OBIGGS. The purpose of the inerting fuel tank system 101, or OBIGGS, is to separate nitrogen from engine bleed air. A fluid flow enters inerting fuel tank system 101 throw valve 108 and enters ozone removal device 102. Ozone removal device 102 removes ozone from the air and is typically a catalytic ozone converter. Valve 108 controls the flow of air into the ozone removal device 102. The fluid then flows to heat exchanger 103 and then to filter 104. Filter 104 may comprise any type of filter that achieves the desired result but is typically a particulate coalesce filter. Valve 109 controls the flow of the fluid between filter 104 and ASM 105. The ASM 105 creates nitrogen enriched air, which flows from ASM 105 through the oxygen sensor 110 and one or more check valves 106 into fuel tank 107. This creates a nitrogen cap in fuel tank 107. Additional valves and sensors are placed throughout inerting fuel tank system 101 to allow for proper use and to control the flow of the air throughout. Pipes or tubing that carry the fluid(s) are present in the inerting fuel tank system 101 and allow the fluid(s) to move throughout inerting fuel tank system 101 from one piece of equipment to the next.

The inerting fuel tank system 101 provides one or more check valves 106 that prevent reverse flow of fuel back into the ASM 105. A typical OBIGGS has two check valves placed in between ASM 105 and fuel tank 107.

An ASM typically has three ports: inlet feed air port, nitrogen enriched air port, and oxygen enriched air port. Air from an outside source enters the ASM via the inlet air port. ASM 105 extracts oxygen from the air to create oxygen enriched air (OEA) and nitrogen enriched air (NEA), which exit via the oxygen enriched air port and the nitrogen enriched air port, respectively. The OEA is removed from the inerting fuel tank system 101 via the oxygen enriched air port and vents to an outside location. The NEA flows to the fuel tank 107 through the nitrogen enriched air port.

Inerting fuel tank system 101 shows the primary components of the system, but there are other components present. Inerting fuel tank system 101 may have other components, such as a turbo booster, for example.

The ASM 105 creates nitrogen enriched air, which flows from ASM 105 through the oxygen sensor 110 and one or more check valves 106 into fuel tank 107. This creates a nitrogen cap in fuel tank 107. Additional valves and sensors are placed throughout inerting fuel tank system 101 to allow for proper use and to control the flow of the air throughout. Pipes or tubing that carry the fluid(s) are present in the inerting fuel tank system 101 and allow the fluid(s) to move throughout inerting fuel tank system 101 from one piece of equipment to the next.

Figure 2:
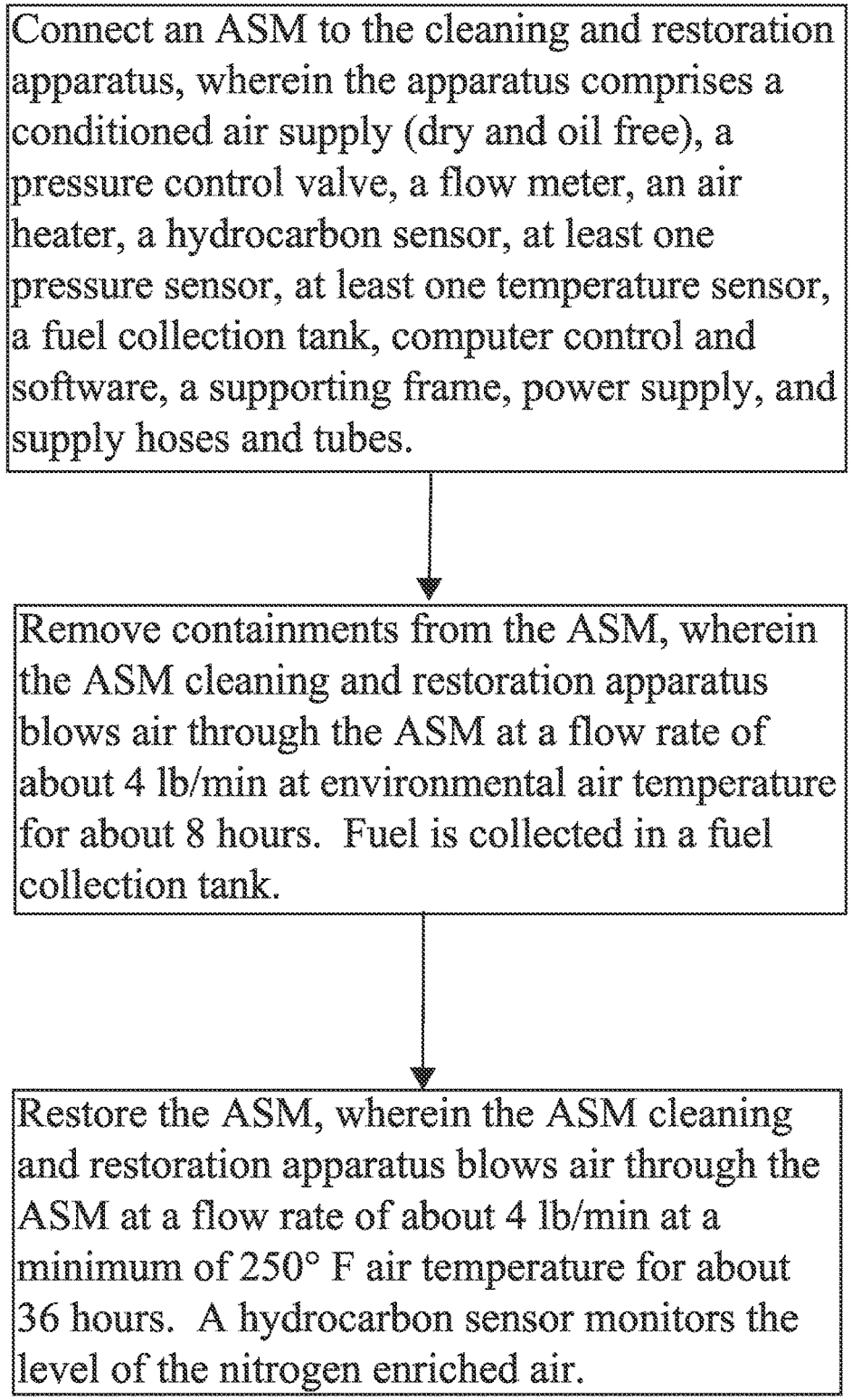
FIG. 2 illustrates a block diagram flow chart showing the ASM cleaning and restoration method of the present invention.

FIG. 2 illustrates a block diagram flow chart showing the ASM cleaning and restoration method of the present invention. The ASM cleaning and restoration method is provided by the ASM cleaning and restoration apparatus of the present invention. The ASM cleaning and restoration method is used on ASMs that are comprised of crosslinked membranes, membranes that can tolerate high heat, and potentially other types of membranes.

The ASM cleaning and restoration apparatus of the present invention is used for the method to clean and restore ASMs, and it consists of the following: conditioned air supply (dry and oil free), pressure control valve, flow meter, air heater, hydrocarbon sensor, pressure sensors, temperature sensors, fuel collection tank, computer control and software, supporting frame, power supply, and supply hoses and tubes. The ASM cleaning and restoration apparatus may have other components that are not listed.

Fuel contamination is a big concern with ASMs, along with the ability of the fibers of the ASM to withstand high temperatures. Other contaminants can also damage the ASMs. The apparatus and method of the present invention removes all contaminants in the ASM and restores the ASM, allowing the ASM to be brought back to its original performance and to be used for longer periods of time.

A hydrocarbon is an organic compound consisting of hydrogen and carbon found in fuel, among other things. When there is fuel present in the ASM, the ASM needs to be cleaned and restored. The ASM cleaning and restoration method of the present invention comprises connecting the ASM cleaning and restoration apparatus to a vertically positioned ASM via the inlet feed air port of the ASM. The ASM cleaning and restoration apparatus cleans the ASM by removing liquid fuel and other contaminants from ASM by blowing air through the ASM. In the preferred embodiment of the present invention, air is blown through the ASM at a flow rate of about 4 lb/min at environmental air temperature for about 8 hours to remove the contaminants of the ASM. The liquid fuel and other contaminants that are removed from the ASM are collected in a fuel collection tank of the ASM cleaning and restoration apparatus.

The ASM cleaning and restoration apparatus begins restoring the ASM when the liquid fuel has been removed from the ASM. In the preferred embodiment of the present invention, a level sensor is located in the fuel collection tank whereby removal of the liquid fuel and other contaminants of the ASM is complete when the level sensor in the fuel collection tank stops rising. The hydrocarbon sensor is not measuring the OEA during the cleaning process.

The determination that all liquid fuel and other contaminants fuel have been removed from the ASM may be accomplished by any number of means, including, but not limited to, a smell test to detect the presence or non-presence of fuel, sensor(s), visual inspection, etc.

For the restoration process, the ASM cleaning and restoration apparatus blows air through the ASM. In the preferred embodiment of the present invention, air is blown through the ASM at a flow rate of about 4 lb/min at a minimum of 250° F. air temperature for about 36 hours to restore the ASM. The flowrates, temperatures, and times are for the preferred embodiment to clean and restore an ASM, although the flowrates, temperatures, and times may vary depending on the type of ASM, amount of contaminants, type of contaminants, etc., but these numbers are not intended to change substantially. The word "about" in this context should include 10% plus or minus.

The hydrocarbon sensor monitors the level of hydrocarbons in the air that flows through the ASM and exits the ASM via the nitrogen-enriched air port during the restoration process. The ASM cleaning and restoration apparatus monitors the air that flows through the ASM and out the nitrogen enriched air port during the restoration and shuts down the ASM cleaning and restoration apparatus when substantially all the hydrocarbons have been removed from the air exiting the ASM via the nitrogen-enriched air port.

Although the parameters for the preferred embodiment have been provided herein, some or all of the flowrates, temperatures, and times may have to be adjusted more than 10% to achieve the desired results based on the type of ASM, amount of contaminants, type of contaminants, etc.

Environmental air means no heating or cooling of the air that is being introduced into the ASM by the ASM cleaning and restoration apparatus needs to occur.

The ASM cleaning and restoration apparatus and method of the present invention gasifies any remaining hydrocarbons in the fibers of the ASM. The hotter the temperature of the air flow, the faster the hydrocarbons are burned off of the ASM. Everything in the ASM has to withstand the heat. 250° F. is the minimum temperature to use.

While the preferred embodiment has been provided herein, the temperatures, flow rates, and flow times provided by the ASM cleaning and restoration apparatus can be changed as desired. Some ASMs may require different temperatures, flow rates, and flow times.

The ASM cleaning and restoration apparatus provides a hydrocarbon sensor that monitors the air that flows through the ASM and out the nitrogen enriched air port during the restoration process and shuts down the ASM cleaning and restoration apparatus when substantially all the hydrocarbons have been removed from the air exiting the ASM via the nitrogen-enriched air port.

After an ASM is cleaned and restored using the present invention, the ASM must pass certain functionality tests as determined by the original equipment manufacturer (OEM) maintenance manuals and other FAA approved methods before the ASM could be returned to service in an aircraft.

The ASM cleaning and restoration method of the present invention can be done in situ, or with the ASM removed.

Solvents or other chemicals can be used in combination with airflow and heat to remove other contaminants from the fibers of the ASM thereby restoring applicable functionality of the ASM.

Given the current scope of use of gas permeable membranes, other industries other than aerospace can benefit from removal of contaminants from gas permeable fibers. Some industries using these membranes that the present invention can restore are: bio-methane production (methane separation), medical industry (toxin removal, various gasses, etc.), food preservation (nitrogen enriched air), and environmental (removal of harmful combustion byproducts), just to name a few.

The present invention is used to remove any number of volatile organic compounds from crosslinked membranes or membranes that can tolerate high heat.

The ASM cleaning and restoration apparatus and method may also provide and monitor pressure of the air streams into and out of the ASM.

The cleaning process of the present invention is meant to remove all liquid fuel and other contaminants, but gaseous fuel and other gases may also be removed during this step but are not measured. Only the liquid fuel and other contaminants are measured in the fuel collection tank during the cleaning process. All references to "liquid fuel and other contaminants" may include any gases, solids, or other liquids that are present in the ASM that are meant to be removed.

Additional steps and/or chemicals/compounds can be introduced into the ASM cleaning and restoration apparatus and method of the present invention, as desired.

The best mode for carrying out the invention has been described herein. The previous embodiments are described in sufficient detail to enable those skilled in the art to make and use the invention. It is to be understood that other embodiments would be evident based on the present disclosure, and that system, process, or mechanical changes may be made without departing from the scope of the present invention.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying figures are to be interpreted in an illustrative and non-limiting sense.

What is claimed is:

1. A method to remove contaminants and restore an air separation module (ASM), comprising:
    connecting an ASM cleaning and restoration apparatus to the ASM,
        wherein the ASM cleaning and restoration apparatus comprises a conditioned air supply (dry and oil free), a pressure control valve, a flow meter, an air heater, a hydrocarbon sensor, at least one pressure sensor, at least one temperature sensor, a fuel collection tank, computer control and software, a supporting frame, power supply, and supply hoses and tubes,
        wherein the ASM comprises a nitrogen-enriched air port, an oxygen enriched air port, and an inlet feed air port,
        wherein the ASM cleaning and restoration apparatus is connected to the ASM via the inlet feed air port;
    removing liquid fuel and other contaminants of the ASM,
        wherein the ASM cleaning and restoration apparatus blows air through the ASM in order to remove the liquid fuel and other contaminants,
        wherein the liquid fuel and other contaminants are collected in a fuel collection tank,
        wherein the air flows freely out of the ASM via the nitrogen-enriched air port and the oxygen enriched air port; and
    restoring the ASM,
        wherein the ASM cleaning and restoration apparatus blows air through the ASM at a rate of about 4 lb/min at a minimum of 250° F. air temperature, and
        wherein the hydrocarbon sensor monitors a level of hydrocarbons in the air as the air exits the ASM via the nitrogen-enriched air port.

2. The method of claim 1, wherein the ASM cleaning and restoration apparatus blows air through the ASM at a flow rate of about 4 lb/min at environmental air temperature for about 8 hours to remove the liquid fuel and other contaminants of the ASM.

3. The method of claim 1, wherein the ASM cleaning and restoration apparatus blows air through the ASM for about 36 hours to restore the ASM.

4. The method of claim 1, wherein the ASM cleaning and restoration apparatus begins restoring the ASM when the liquid fuel and other contaminants have been removed from the ASM.

5. The method of claim 1, wherein the ASM cleaning and restoration apparatus shuts down when substantially all the hydrocarbons have been removed from the air exiting the ASM via the nitrogen-enriched air port.

6. The method of claim 1, wherein the computer control and software control a temperature, a flow rate, and a length of time for the air flow to the ASM from the ASM cleaning and restoration apparatus.

7. The method of claim 1, wherein the ASM is comprised of crosslinked membranes.

8. The method of claim 1, wherein the ASM cleaning and restoration apparatus introduces solvents or other chemicals to the ASM.

9. The method of claim 1, wherein the power supply of the ASM cleaning and restoration apparatus is provided by an outside source.

10. The method of claim 1, wherein the ASM is vertically positioned.

11. The method of claim 4, wherein a level sensor in the fuel collection tank monitors the removal of the liquid fuel and other contaminants from the ASM.

* * * * *